L. T. VELEN.
CORN HARVESTER.
APPLICATION FILED SEPT. 18, 1912.
1,184,794.
Patented May 30, 1916.
5 SHEETS—SHEET 1.
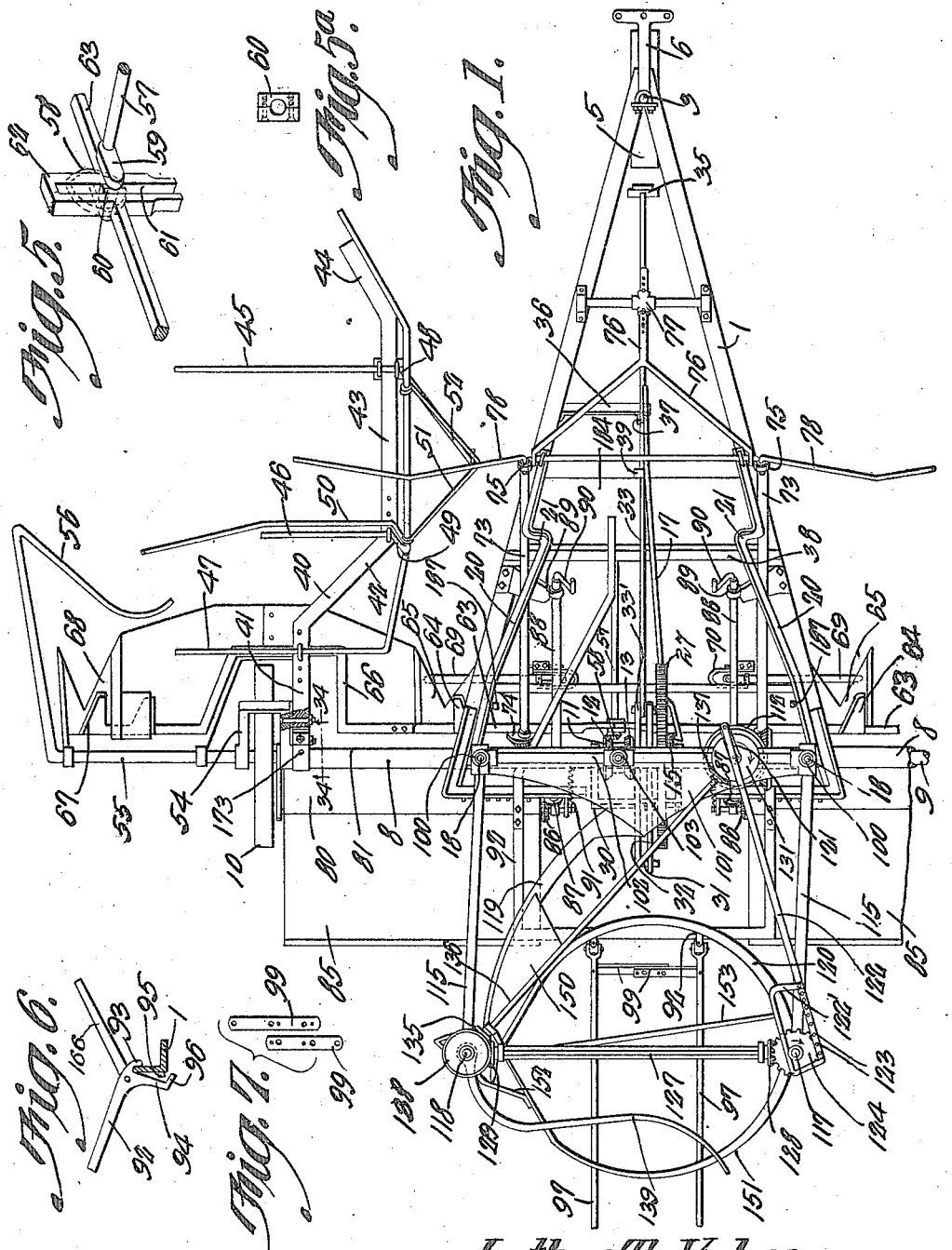

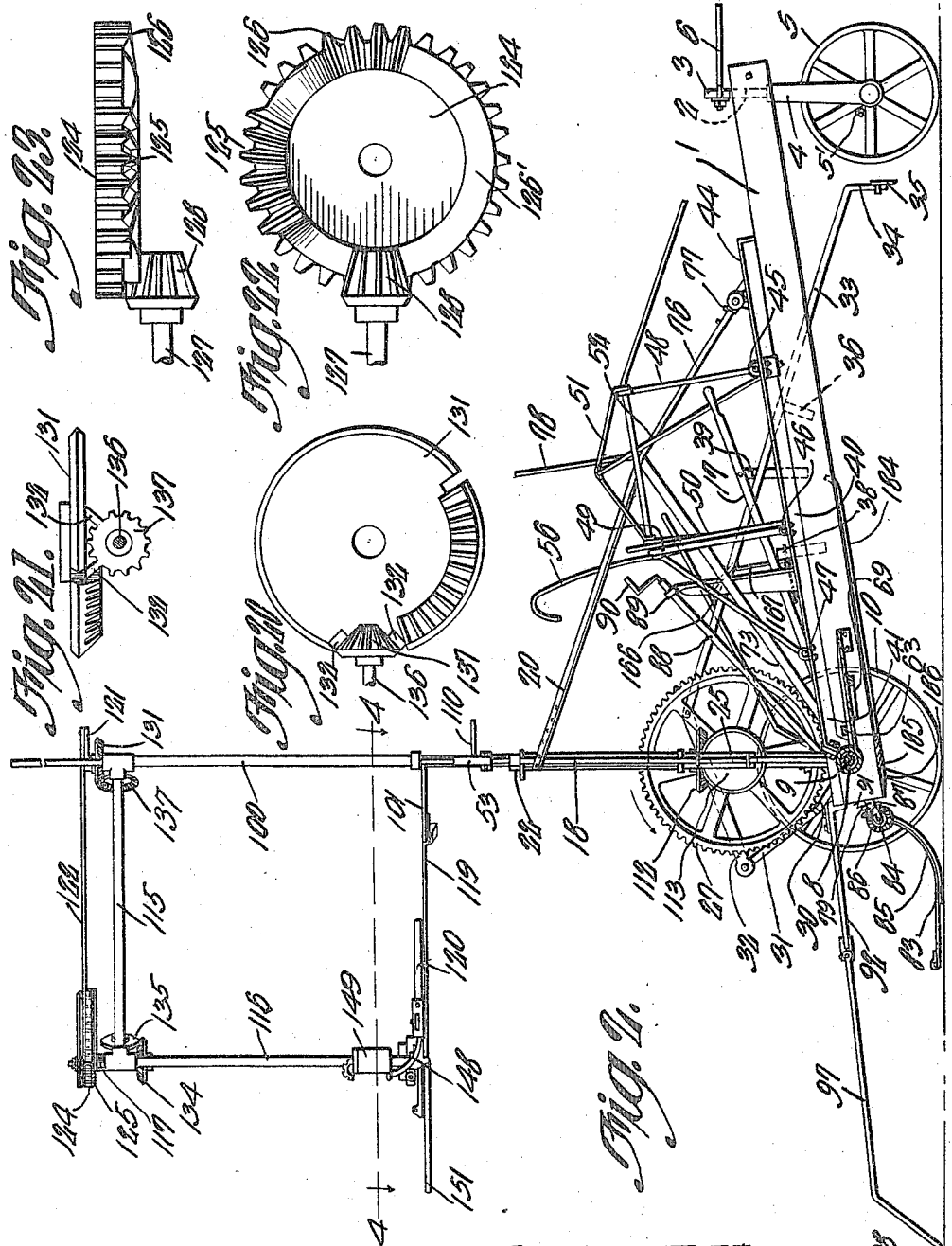

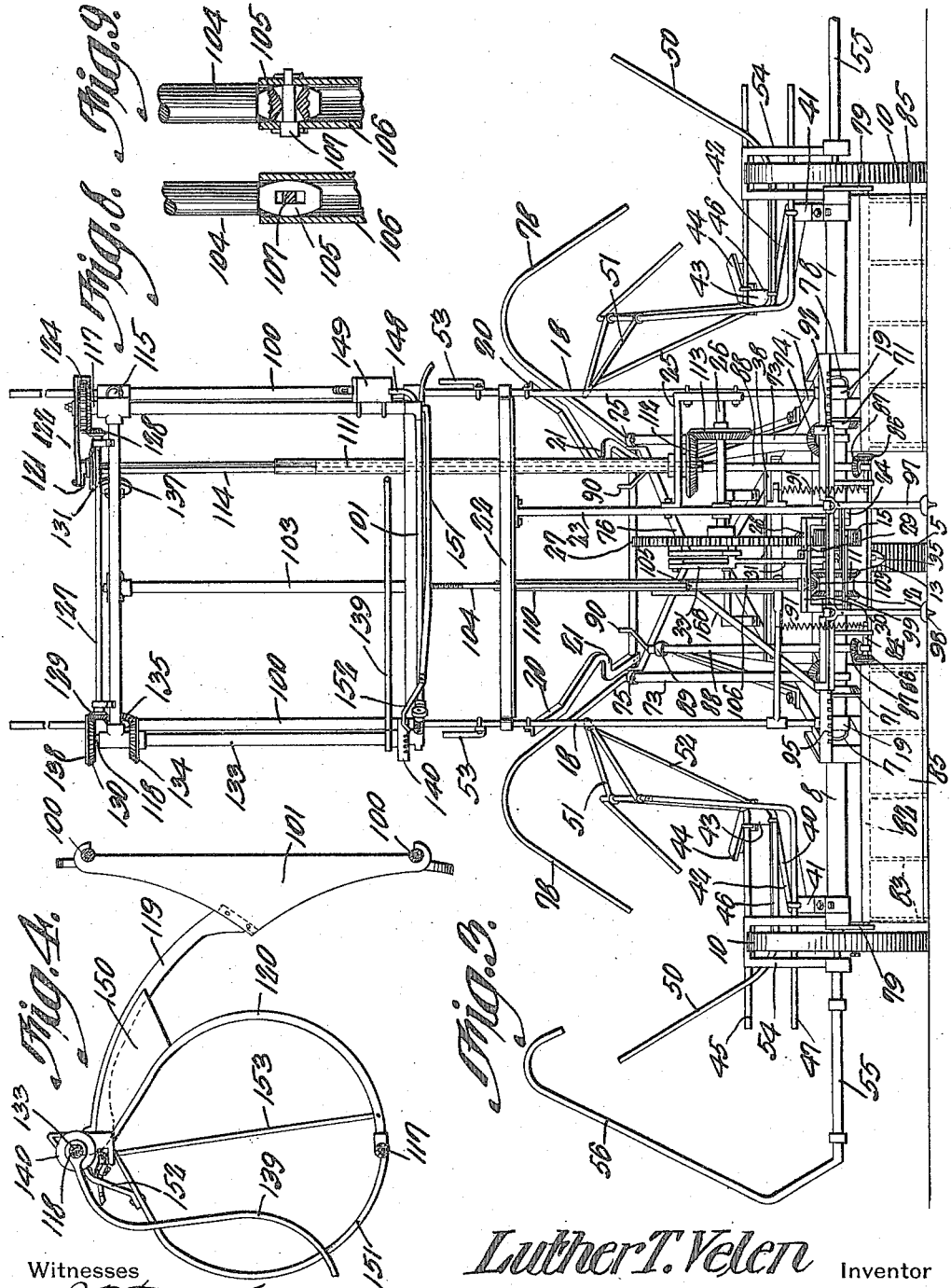

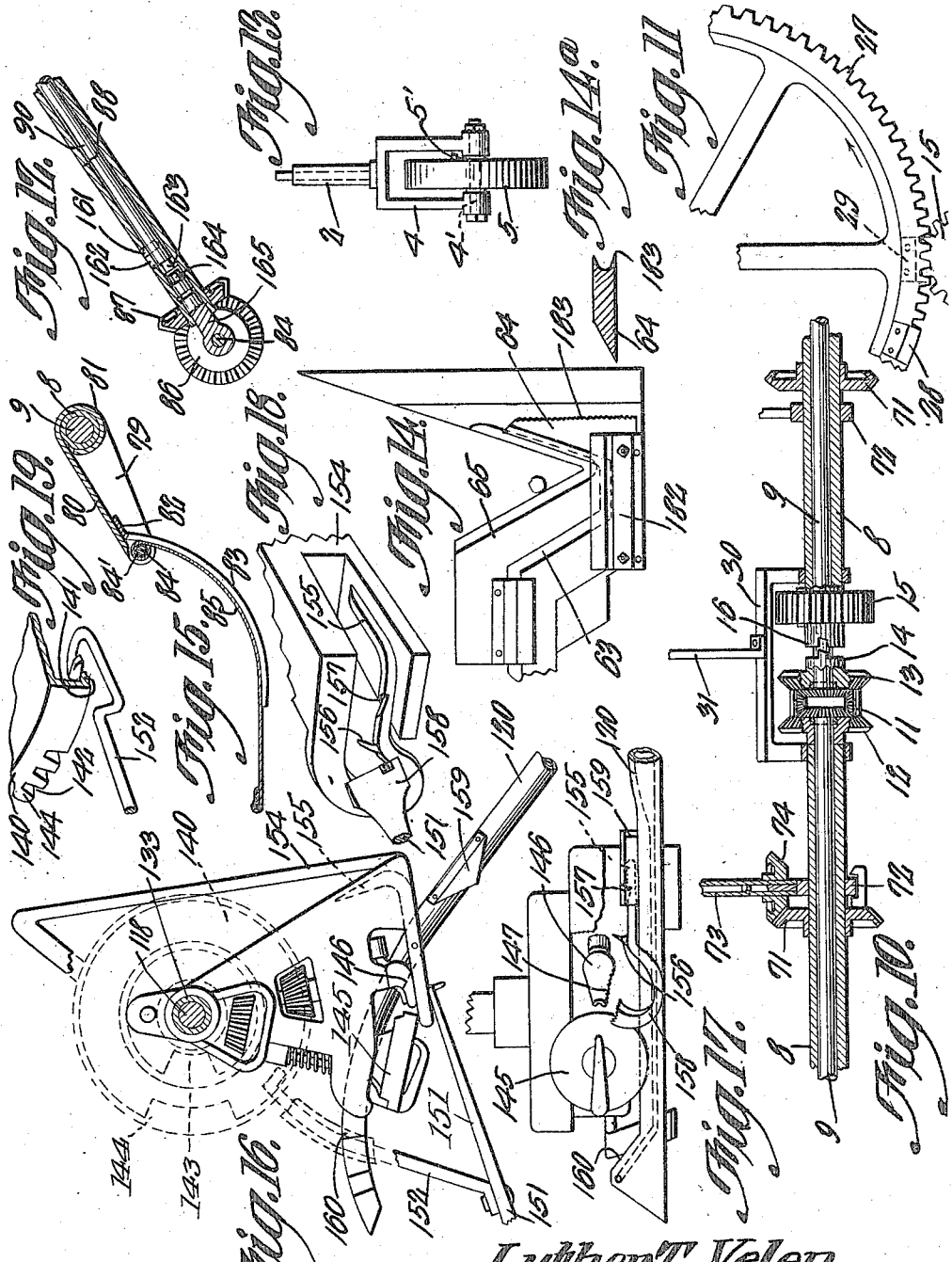

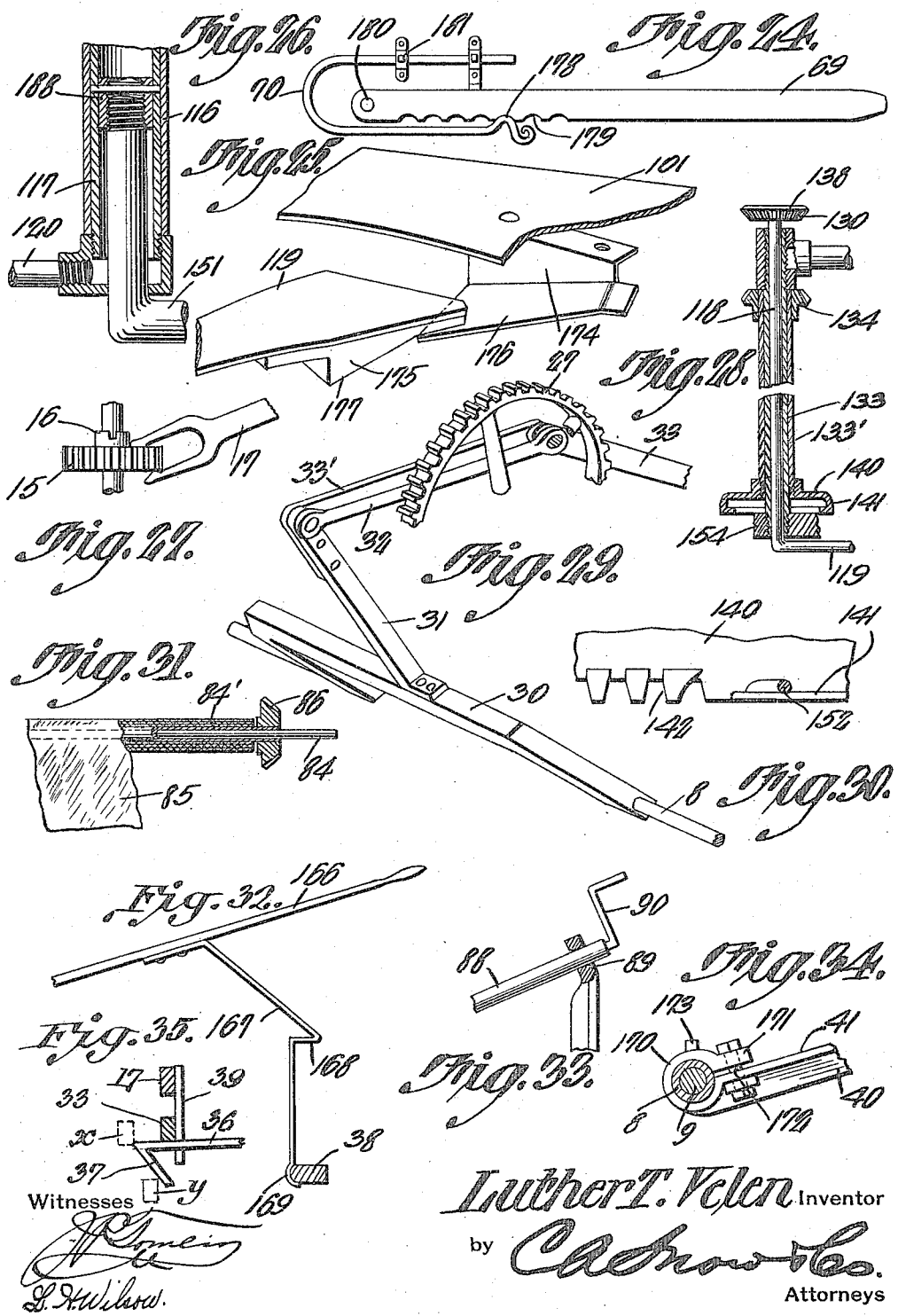

UNITED STATES PATENT OFFICE.

LUTHER T. VELEN, OF WASHINGTON, DISTRICT OF COLUMBIA.

CORN-HARVESTER.

1,184,794.  Specification of Letters Patent.  Patented May 30, 1916.

Application filed September 18, 1912. Serial No. 721,090.

*To all whom it may concern:*

Be it known that I, LUTHER T. VELEN, a citizen of the United States, residing at Washington, District of Columbia, have invented a new and useful Corn-Harvester, of which the following is a specification.

This invention has relation to corn harvesters and it consists in the novel construction and arrangement of its parts as hereinafter described and claimed.

The object of the invention is to provide a corn harvester of comparatively simple structure which is adapted to operate upon the stalks of corn standing in several different rows and for the purpose of severing the stalks in the vicinity of the ground and for collecting the stalks thus cut in the bunches which are deposited in cradles with which the machine is provided.

Prior to the cutting of the stalks and while they are still standing in the row, means is provided for bending the upper portions of the stalks in a forward direction so that the fibers of the stalks at the bases thereof are subjected to a certain amount of stress or tension and the fibers thus drawn taut are encountered by the cutting apparatus of the harvester and the stalks are cut and are permitted to fall from inclined positions into approximately horizontal positions in the cradle.

Means are provided for swinging the cradles from approximately horizontal positions to approximately vertical positions whereby the bunches of stalks are turned to erect or vertical positions. Means are provided for ejecting the stalks from the cradles and for moving them toward the central portion of the machine at the time that they are brought to vertical positions.

A further object of the invention is to provide means for bringing the heads or top ends of the bunches together and compressing them and at the same time binding the heads or tops together. At the same time means are provided for holding the butt ends of the bunches of stalks at the opposite sides of the machine spaced from each other.

A further object of the invention is to provide novel and simple means for ejecting the bundle thus bound from the machine so that it will stand in upright position upon the ground thereby constituting a completed shock. At the time that the bound shock is ejected from the machine means is provided for separating or spreading the butt ends of the stalks in the direction of the travel of the machine, therefore when the shock is positioned upon the ground the heads of the stalks are inclined toward each other and are bound together while the butt ends of the stalks are spread and thus an ample foundation is provided for the shock which enables it to stand in an erect position upon the field notwithstanding high winds or other effects of the elements which might have a tendency to tumble the shock over.

Another object of the invention is to provide a cutting apparatus of especial design which is adapted to manipulate the stalks at the time that they are severed from the stumps thereof so as to assist in moving the stalks toward the positions they finally occupy in the shock.

Another object of the invention is to provide a weed depressor which not only bends down weeds adjacent the stumps of the stalks but also bends the stumps down so that they will not interfere or become tangled with the cutting apparatus or any other parts of the machine.

A further object of the invention is to provide means for collecting and holding the stalks which are being cut from the rows while the cradles are swinging from approximately horizontal positions to vertical positions and in conjunction with the said stalk holding means other means is provided for ejecting the stalks from the said stalk holding means into the cradles when the cradles assume horizontal positions.

Another object of the invention is to provide means for tilting the supports of the shock binding mechanism so that the stalks will be received into the shock approximately in upright positions irrespective of the slant or inclination of the surface of the soil over which the machine may pass. Also means is provided for shifting the shock binding mechanism vertically in order that it may be positioned to accommodate and operate upon shocks of tall or short corn.

With the foregoing and other objects in view as will appear as the description proceeds the invention resides in the combination and arrangement of parts and in the details of construction hereinafter described and claimed, it being understood that changes in the precise embodiment of the invention herein described, can be made within the scope of what is claimed, without departing from the spirit of the invention.

In the accompanying drawings: Figure 1 is a top plan view of the corn harvester with one side portion thereof broken away. Fig. 2 is a side elevation of the harvester, portions of the near side being shown in section. Fig. 3 is a rear elevation of the harvester with part at the right side of the machine broken away. Fig. 4 is a horizontal sectional view of the rear part of the corn harvester cut on the line 4—4 of Fig. 2. Fig. 5 is a perspective view of a crank mechanism used upon the harvester. Fig. 5ª is a detail view of the block which is slidable in the head of the cutting apparatus. Fig. 6 is a detailed view of the forward portion of one of the arms for holding the bases of the bunches of stalks separated while they are being ejected from the machine. Fig. 7 is a detailed plan view of links which are used for holding the spreaders of the bundle bases properly spaced with relation to each other. Fig. 8 is a vertical sectional view of part of a shaft used for transmitting movement from the operating parts of the harvester to the bunch compressing and binding mechanism thereof. Fig. 9 is a similar view taken at a right angle to the view as shown in Fig. 8. Fig. 10 is a longitudinal sectional view of sleeves and axle shafts located therein which support the rear part of the machine. Fig. 11 is a side elevation of a portion of a master wheel used upon the machine. Fig. 12 is a longitudinal sectional view of means for winding and unwinding flexible trailing curtains with which the machine is provided. Fig. 13 is an edge elevation of a caster wheel which supports the forward part of the frame of the machine. Fig. 14 is a plan view of one of the apparatus for cutting the stalks at the outermost side of the machine. Fig. 14ª is a section through one of the cutting blades. Fig. 15 is a longitudinal sectional view of one of the trailing curtains of the machine. Fig. 16 is a top plan view of the knotting mechanism of the machine with parts in section, parts broken away and parts in dotted lines. Fig. 17 is an edge elevation of the knotting mechanism of the machine with parts broken away. Fig. 18 is a perspective view of the twine guide used in combination with the knotting mechanism of the machine. Fig. 19 is a perspective view of means for holding one of the arms for receiving the bunches of stalks. Fig. 20 is an under plan view of a disk for operating the twine holder of the tying mechanism. Fig. 21 is an edge view of the same. Fig. 22 is an under plan view of set of teeth for operating the knotter of the tying mechanism. Fig. 23 is an edge view of the same. Fig. 24 is an enlarged plan view of the inner depressor used on the harvester. Fig. 25 is a perspective view of the inner portion of a plate used upon the harvester. Fig. 26 is a vertical sectional view illustrating the manner in which the shock holder is connected with the needle of the harvester. Fig. 27 is a plan view of a gear wheel used upon the harvester showing the end portion of a lever for moving the same. Fig. 28 is a vertical sectional view illustrating the manner in which the bundle gathering arm is mounted upon the harvester. Fig. 29 is a perspective view of a yoke and adjacent parts used upon the harvester. Fig. 30 is an inner view of a portion of the disk shown in Fig. 19. Fig. 31 is a plan view with parts in section of a trailing curtain used upon the harvester. Fig. 32 is a side elevation of a lever securing means provided upon the harvester. Fig. 33 is a side elevation of the upper portion of a shaft used upon the harvester showing the bearing therefor in section. Fig. 34 is an enlarged sectional view of part of the harvester cut on the line 34—34 of Fig. 1. Fig. 35 is a front elevation of a portion of the beam supporting and deflecting arm, a portion of the fluke carrying beam and of the shifting lever being shown.

Corresponding and like parts are referred to in the following description and indicated in all the views of the accompanying drawings by the same reference characters.

The harvester comprises a frame 1 which is triangular in plan as best shown in Fig. 1 of the drawing. This frame is inclined in upward direction from its rear end toward its front end as best seen in Fig. 2. A sleeve 2 is secured at the forward end of the frame 1 and passes vertically through the same. A shaft 3 is journaled in the sleeve 2 and is connected at its lower end with the caster frame 4. A wheel 5 is journaled in the frame 4 and is adapted to travel upon the surface of the soil. A clevis 6 is secured to the upper end of the shaft 3 and is adapted to be used as means for connecting the draft animals with the machine. By this arrangement it will be seen that the shaft 3 is free to turn in the sleeve 2 and consequently the wheel 5 may turn with the shaft 3 to accomplish the guiding of the machine over the field.

As illustrated in Fig. 13 of the drawing, a spindle 4' is journaled in the lower part of the caster frame 4 and a set screw 5' passes through the hub of the wheel 5 and engages the said spindle whereby the spindle rotates in unison with the wheel. By such an arrangement ample bearing is provided between the caster frame 4 and the spindle and the parts are securely held in position.

The rear part of the frame 1 is provided with bearings 7 in which are journaled sleeves 8. These sleeves receive axle shafts 9 as shown in detail in Fig. 10. Ground wheels 10 are fixed to the outer ends of the axle shafts 9 and are designed to travel upon the surface of the soil and support the rear part of the frame 1. The inner ends of the shafts 9 are operatively connected together by a compensating gear 11 as best shown in Fig. 10. A gear wheel 12 is fixed to the inner end of one of the sleeves and a gear wheel 13 is fixed to the shaft 9 which passes through the other sleeve 8. The gear wheel 13 is provided with the clutch hub 14. A gear wheel 15 is slidably mounted on the axle shaft 9 to which the gear wheel 13 is fixed but is contrained to rotate in unison with the said axle shaft. The gear wheel 15 is provided with the clutch hub 16 which is adapted to engage the clutch hub 14 of the gear wheel 13. A lever 17 is mounted upon the frame 1 and engages the sides of the wheel 15 and may be used to move the gear wheel 15 along the axle shaft 9 upon which it is mounted to cause the hub 16 thereof to engage or disengage the clutch hub 14 of the gear wheel 13.

Uprights 18 are provided at their lower ends with bearings 19 which loosely receive the sleeves 8 between the side portions of the frame 1 and in close proximity thereto. Bars 20 are pivotally connected at their forward ends with the sides of the intermediate portion of the frame 1 and are adjustably connected at their rear ends with the intermediate portions of the uprights 18. The bars 20 are designed to hold the uprights 18 at predetermined angles with relation to the frame 1. But by providing adjustable connections between the bars 20 and the uprights 18 the said uprights may be changed in their angular relation to the plane of the frame 1. The object of this will appear hereinafter. The bars 20 are provided at points between their ends with inwardly disposed shoulders constituting notches 21.

A cross piece 22 is connected at its ends with the uprights 18 above the bars 20 and an upright 23 is connected at its upper end with the cross piece 22 and at its lower end is provided with a bearing indicated at 24 in Fig. 3 which receives one of the sleeves 8. A bracket 25 is connected at one end with the upright 23 and at its other end with one of the uprights 18. A counter shaft 26 is journaled in the bracket 25 and the upright 23 and is provided at its inner end with a relatively large gear wheel 27 which meshes with the gear wheel 15 hereinbefore described. The gear wheel 15 is of greater transverse thickness than the gear wheel 27. The gear wheel 27 is provided at one side of its set of gear teeth with a plate 28 and at its opposite side with a plate 29. These plates are best shown in Fig. 11 of the drawing although they are indicated in Fig. 3.

When the clutch hub 16 of the gear wheel 15 is moved manually into engagement with the clutch hub 14 of the wheel 13 as hereinbefore described the plate 28 moves along the outer side of the wheel 15 and forces the clutch hub 16 into positive engagement with the clutch hub 14 of the wheel 13 and thus during the time that motion is being initially transmitted from one of the axle shafts 9 to the wheel 27 and the shaft 26 upon which it is mounted the strain to which the gear wheel 15 is suddenly subjected cannot force the said wheel 15 away from the wheel 13 so that the clutch members 16 and 14 disengage each other for the plate 28 carried at the side of the wheel 27 holds the wheel 15 toward the wheel 13. When the wheel 27 has completed one revolution the plate 29 at the opposite side thereof encounters the inner face of the gear wheel 15 and moves the said gear wheel away from the gear wheel 13 so that the clutch member 16 automatically disengages the clutch member 14. In order to accomplish this movement of the gear wheel 15 from the gear wheel 27 it must be understood that the plates 28 and 29 are disposed at slight angles to the plane of the wheel 27. This angular inclination of the said plates is best indicated in Fig. 3 of the drawing.

A yoke 30 is fixed at its ends to the inner portions of the sleeves 8 and the intermediate portion of the said yoke bridges the gear wheel 15 and the compensating gear 11 as shown in Fig. 10. An arm 31 is fixed to the intermediate portion of the yoke and a link 32 is pivotally connected at its rear end with the upper end of the arm 31 and at its forward end is pivotally and eccentrically connected at the side of the gear wheel 27. A beam 33 is pivoted at its rear end to an arm 33' which is fixed to the upper end of the arm 31 as best shown in Fig. 29. This beam extends forwardly and downwardly through the forward part of the frame 1 and is provided at its forward end with a downturned extremity 34 upon which is adjustably mounted a fluke 35. The forward portion of the beam 33 is normally held elevated with relation to the surface of the ground by an arm 36 which extends inwardly from one of the sides of the frame 1. This arm is provided at its inner end with a downwardly disposed extremity 37 which lies in the path of movement of the beam 33 and which is disposed at an angle to a vertical plane. A cross bar 38 is carried by the frame 1 and lies in the path of movement of the beam 33. The lever 17 hereinbefore described is provided with a tongue 39 which normally engages a side of the intermediate portion of the beam 33. Therefore when the lever 17 is swung laterally so as to move the wheel 15 and engage the clutch hub 16 with the clutch hub 14 the said tongue 39 moves the forward portion of the beam 33 sidewise so that the beam passes beyond the inner end 37 of the arm 36 as shown at X in Fig. 35. The beam then shifts laterally to position under the downwardly and outwardly inclined deflecting extremity 37, as shown at Y in Fig. 35 and the forward part of the beam 33 falls to the ground and the fluke 35 enters the soil. Thus the beam 33 for the time being comes to a state of rest while the machine is moving in a forward direction and consequently the said beam will assist to push the upper part of the wheel 27 over its center in a rearward direction and therefore the beam 33 assists the wheel 15 and its coöperating parts in turning the wheel 27. When the point of pivotal connection between the beam 33 and the arm 33' passes under the center of the wheel the intermediate portion of the beam 33 encounters the cross bar 38 and the said bar serves as a fulcrum whereby as the rear end of the beam is carried in a downward direction by the wheel 27 the forward part of the beam is raised and the fluke 35 is lifted out of the soil. As the forward portion of the beam 33 encounters the downturned extremity 37 of the arm 36 the forward end of the beam is deflected slightly to one side during its upward movement. When however the forward part of the beam 33 is raised above the inner end of the arm 36, the beam being resilient, returns automatically to its normal position over the end of the arm 36 and when the wheel 27 completes one revolution the forward part of the beam 33 falls upon the inner end portion of the arm 36 and is supported thereby. By adjustably mounting the fluke 35 on the beam 33 the said fluke may be caused to enter the soil to any desired depth when the forward end of the beam is permitted to fall as just above described.

Arms 40 are fixed at their rear ends to the outer ends of the sleeves 8. The forward portions of the arms 40 are spaced from the sides of the frame 1. Each arm consists of an inner end portion 41 which is at right angles to the sleeve 8. An intermediate portion 42 which is disposed at an angle to the sleeve 8, an intermediate portion 43 which is at right angles with the sleeves 8 and an extremity 44 which is disposed outwardly with relation to the frame 1 and at an angle to the sleeve 8. These arms carry cradles adapted to receive the cut stalks which will now be described. The cradles are adjustably mounted upon the inner end portions 41 and intermediate portions 43 of the arms as best indicated in Fig. 1 of the drawing. Each cradle comprises a forward rod 45, an intermediate rod 46 and a rear rod 47. The outer ends of the rods 45, 46 and 47 are disposed beyond the outer sides of the arms 40 and the rods 45 and 46 are provided with inner portions 48 and 49 respectively through which the inner portion of the rod 47 passes. The inner portion of the said rod 47 is located above the arm 40 and is disposed in a forward direction as best shown in Fig. 1 and serves as a guide for the upper portions of the stalks. A stalk ejector 50 is pivotally mounted upon the inner portion of the rod 47 between the inner portions 48, 49 of the rods 45 and 46. The outer portion of this ejector 50 normally lies below the rods 45 and 46 but the ejector 50 is provided at its inner end with an inwardly disposed extension 51 which is disposed over the stalk passage between the arm 40 and the side of the frame 1. A rod 52 is connected with the inner portion of the extension 51 and slidably engages the inner edge portion of the arm 40. Abutments 53 are adjustably mounted upon the uprights 18 in the paths of movement of the inner portions of the extensions 51. Therefore it will be seen that when the sleeves 8 are rotated by the wheel 27 and through the coöperation therewith of the yoke 30, arm 31 and link 32 the forward ends of the arms 40 are swung upwardly and rearwardly. Prior to this the cradles mounted upon the said arms have received bunches of stalks. When the said arms 40 are approximately in vertical positions or are approaching such positions, the extensions 51 of the stalk ejectors 50 strike the uprights 18 and thus the said stalk ejectors are turned or swung upon the intermediate portions of the rods 47 and the stalks are moved from the opposite sides of the machine toward each other. When the cradles swing forward the abutments 53 return the ejectors to their normal positions in the cradles.

Yokes 54 are secured to the ends of the sleeves 8 and pass around the upper forward portions of the wheels 10. Shafts 55 are carried at the outer ends of the yokes 54 and extend approximately in alinement with the axle shafts 9 as best indicated in Fig. 3. Stalk catchers 56 are carried at the outer ends of the shafts 55 and are adapted to coöperate with other parts of the machine to be described, hereinafter for directing the stalks which are cut at the outermost rows into the cradles just above described. When the cradles are turned to vertical positions these stalk catchers 56 serve as means for retaining and holding the outermost stalks as they are cut while the cradles are not in position to receive the same.

The cutting apparatus of the machine will now be described. A shaft 57 is journaled upon the frame 1 and is provided at its rear end with a gear wheel 58 which meshes with the gear wheel 12 hereinbefore described. The shaft 57 is provided with cranks 59 which separate at their outer end portions, a block 60 best shown in Fig. 5. This block is received within an opening 61 of a head 62. The head 62 is fixed to the inner ends of the bars 63. The bars 63 are provided with cutting blades 64 which are sharpened at their inner edges and are dull at their outer edges. The blades 64 are located above fixed blades 65. The outer ends of the bars 63 are connected with U-shaped bars 66 which extend around the forward parts of the wheels 10 and which are provided at their outer ends with blades 67. The blades 67 are provided at their outer ends with cutting edges which coöperate with fixed cutting blades 68 located at the extremities of the sides of the machine. Therefore it will be seen that as the wheel 12 rotates, rotary movement is transmitted through the wheel 58 to the shaft 57 which in turn through the cranks 59 and block 60 reciprocates the bars 63 back and forth. Thus the blades 64 and 67 are moved over the fixed blades 65 and 68 and the stalks in four rows of corn are cut. Bars 69 are supported at their inner ends upon springs 70 which in turn are connected to the frame 1 and the outer free ends of the bars 69 extend across the fixed blades 65 and are located below the same. These bars 69 are adapted to encounter weeds and the stumps of the stalks and press the same down so that they may not become tangled with the cutting mechanism or any other parts of the machine. Gear wheels 71 are fixed to the sleeves 8 and bearings 72 loosely receive the sleeves 8 and are located adjacent the gear wheels 71. The lower ends of the shafts 73 are journaled upon the bearings 72 and the said shafts are provided at their lower ends with gear wheels 74 which mesh with the gear wheels 71. The upper ends of the shafts 73 are journaled in bearings 75 which are carried at the rear ends of a Y-shaped arm 76. The forward part of this arm 76 is adjustably received in a collar 77 which is mounted at the forward part of the frame 1. By adjusting the forward portion of the arm 76 in the said collar the bearings 75 may be raised or lowered. Stalk bending arms 78 are carried at the upper ends of the shafts 73 and normally lie across the stalk passages between the sides of the frame 1 and the arms 40. When however, the arms 40 are swung to vertical positions as hereinbefore described and the sleeves 8 are turned, the gear wheels 71 rotate the gear wheels 74 which in turn rotate the shafts 73. Thus the stalk bending arms 78 are first swung away from the cradles and out of the paths of movement of the same and the said cradles may swing to upright positions and the bunches of stalks are ejected therefrom. At this time however the blades 64 continue to cut the stalks and the stalks that are now being cut are forced by the rods 52 over into the notches 21 of the bars 20. As the arms 78 rotate back to their normal positions when the cradles swing back to their normal positions the said arms 78 engage the stalks which have been received in the notches 21 and push the same into the cradles which are mounted upon the arms 40. The arms 78 when in their normal positions engage the standing stalks and bend the upper ends forward so that the fibers at the bases of the stalks are stretched and may be more readily cut by the blades 65. Also the said arms 78 coöperate in conjunction with the extensions 51 to direct the stalks into the cradles and lay them down in the same. The stalk catchers 56 bend the stalks in a forward direction in advance of the blades 67 and direct them into the cradles carried by the arms 40. When the stalk catchers are swung back with the arms 40 they catch the stalks which are cut at this time by the blades 67 and as soon as the cradles and the arms 56 are swung forward, the said arms 56 throw the stalks thus cut into the cradles.

Arms 79 are pivoted upon the end portions of the sleeves 8 and extend rearwardly therefrom. Platforms 80 are provided at their forward ends with curls 81 which receive the intermediate portions of the sleeves 8 and the said platforms are connected in any suitable manner with the arms 79. Strips 82 are secured to the under sides of the platform 80 and are provided with downwardly and rearwardly projecting bowed ribs 83. These ribs are of sheet metal and consequently they possess more or less resiliency. The lower end portions of the ribs are adapted to trail upon the surface of the ground. Shafts 84 are located between the arms 79 and sleeves 84' are journaled on the shafts and curtains 85 of canvas or other suitable material are adapted to wind upon and unwind from the said sleeves 84'. The forward portions of the curtains 85 are supported by the ribs 83 and the rear portions of the said curtains are adapted to trail upon the ground.

Gear wheels 86 are fixed to the inner end portions of the sleeves 84' and mesh with gear wheels 87 which are mounted at the lower ends of shafts 88. The upper portions of the shafts 88 are journaled in bearings 89 which are supported upon the frame 1. Therefore it will be seen that by rotating the shafts 88 the wheels 87 will rotate the wheels 86 and sleeves 84' and thus the curtains 85 may be wound upon or unwound from the sleeves 84'. Therefore the extent to which the said curtains will project behind the frame of the machine may be regulated.

Fig. 12 of the drawing is a detailed sectional view of the lower portion of one of the shafts 88. These shafts 88 are hollow and handles 90 are movably mounted therein. Each handle is provided with a pin 161 which passes through a slot 162 provided in the hollow shaft 88. Thus the handle 90 may be moved longitudinally with relation to the shaft 88 but the shaft will rotate with the handle when the handle is rotated. The handle is provided at its lower end with a socket 163 which is adapted to receive a head 164 carried by an arm 165 which is mounted upon the shaft 84. The head 164 and arm 165 do not rotate and therefore when the socket 163 receives the head 164 the handle 90 and the shaft 88 are locked against rotation and thus the curtain 85 attached to the sleeve 84' is prevented from unwinding from the said sleeves.

It is to be understood that when the stalks are turned from approximately horizontal positions to vertical positions their butt ends will first move rearwardly along the platforms 80. Then the butt ends of the stalks will move down upon the curtains 85 and as the machine moves in a forward direction the curtains are drawn from under the butt ends of the stalks. As the stalks come in contact with the surface of the ground they immediately come to a state of rest while the stalks just in front will follow the curtains for short distances and therefore the butt ends of the stalks are spaced from each other in lines parallel with the line of draft of the machine. Springs 91 are connected at their lower ends with the shafts 84 and at their upper ends with any suitable part of the frame 1 and are under tension with a tendency to hold the rear ends of the arms 79 elevated. However, the said arms and the parts supported thereby may swing down slightly when they are subjected to the weight of the stalks but as soon as the stalks pass off of the platforms 80 the said springs will elevate the shafts 84 and the arms 79 to their normal positions.

Means are provided for holding the bunches of stalks at the opposite sides of the machine spaced from each other at their bases and these means include arms 92 which are provided at their rear ends with lugs 93 adapted to lie over the upper edge of the rear part of the frame 1. The arms 92 are provided with lugs 94 which are adapted to lie between the pins 95 carried at the rear side of the frame 1. The detailed structure of the forward portions of the arms 92 and the manner in which they are connected with the rear bar of the frame 1 is best illustrated in Fig. 6 of the drawing. Each arm 92 is provided at its inner rear end with a lip 96 which is adapted to fit under the lower side of the rear bar of the frame 1 when the arm is in position. As shown in Fig. 3 of the drawing the pins 95 are arranged in sets and therefore the arms 92 may be adjusted transversely along the rear side of the frame 1. Trailing members 97 are pivotally connected at their forward ends by means of universal joints with the rear ends of the arms 92 and are bent down at their rear ends forming extremities 98 adapted to drag along the surface of the ground. Links 99 (shown in detail in Fig. 7) are connected at their outer ends with the forward portions of the trailing members 97 and are adjustably connected with each other at their intermediate portions. Thus the arms 92 and the trailing members 97 connected thereto may be positioned relatively close to each other or remote from each other as desired. The bunch of stalks which is collected at one side of the machine is adapted to pass along one of the trailing members 97 while the bunch of stalks which is collected at the opposite side of the machine passes along the other trailing member 97 when the stalks are ejected from the machine and thus the bunches at the opposite sides of a shock are inclined toward each other. The stalks are so disposed that they provide an ample base for the shock to keep the same in erect position upon the ground.

Tubes 100 are slidably mounted upon the upper portions of the uprights 18, a plate 101 is carried at the lower ends of the tubes 100. This plate is located between the uprights 18 and extends rearwardly therefrom. A cross bar 102 connects the upper ends of the tubes 100 together. A tube 103 depends from the intermediate portion of the cross bar 102 and the upper end of a screw 104 (best shown in Fig. 3) is threaded in the lower end of the tube 103. The lower end of the screw 104 is connected by means of a universal joint 105 with a sleeve 106, (see Figs. 8 and 9). The screw 104 is provided with a square bolt 107 having round ends journaled in the sides of the sleeve 106. It will therefore be seen that the sleeve 106 may be swung laterally with relation to the lower end of the screw 104 while the screw 104 is constrained to rotate in unison with the sleeve 106. A beveled gear wheel 109 is mounted at the lower end of the sleeve 106 and is adapted to be moved in contact with either of the wheels 12 or 13 hereinbefore described. A lever mechanism 110 is provided for swinging the lower end portion of the sleeve 106. Therefore when the gear wheel 109 is moved into engagement with the wheel 12 the sleeve 106 and screw 104 will be rotated in one direction whereby the engagement of the screw 104 with the tube 103 will elevate the cross bar 102 and the parts attached thereto. When the gear wheel 109 is moved into engagement with the gear wheel 13 the sleeve 106 and screw 104 will rotate in an opposite direction whereby the cross bar 102 and the parts attached thereto will be lowered along the uprights 18.

A hollow shaft 111 is journaled at its lower end in the bracket 25 and at its upper end in the cross bar 102. A wheel 112 is fixed to the lower end of the shaft 111 and meshes with a wheel 113 which is fixed to the shaft 26. A shaft section 114 is slidably mounted in the upper end of the shaft 111 but is constrained to rotate in unison with the shaft 111.

Arms 115 extend rearwardly from the upper ends of the tubes 100 and carry downwardly disposed tubes 116 and 133. A shaft 118 is journaled in one of these downwardly disposed tubes, 133 and a shaft 117 is journaled in the other tube 116. An arm 119 is fixed to the lower end of the shaft 118 and a needle 120 is fixed to the lower end of the shaft 117. A crank 121 is carried at the upper end of the shaft section 114 and a bar 122 is pivotally connected at one end with the said crank 121. The bar 122 is provided at its rear end with a set of rack pins 123 which mesh with a wheel 124 fixed to the upper end of the shaft 117. The bar is also provided with a guide 122' which bears against a grooved roller journaled at the upper end of the shaft 117. Gear teeth 125 are provided at the under side of the wheel 124 and another set of gear teeth 126 is also provided at the under side of the said wheel 124. A shaft 127 extends transversely across the rear part of the machine and is provided at one end with a gear wheel 128 which is adapted at times to engage both sets of gear teeth 125 and 126 as the wheel 124 is turned by the rack pins 123. A gear wheel 129 is fixed to the other end of the shaft 127 and is adapted to mesh with gear teeth 130 provided at the under side of a wheel 138 fixed to the upper end of the shaft 118. These parts are so arranged that the arm 119 opens simultaneously with the needle 120 whereby the arm 119 is behind one of the bunches of stalks and the needle is behind the other bunch. When the said bunches are brought to an upright position upon the platform 80 the arm 119 swings inwardly as does also the needle 120 and the top ends of the bunches of stalks are brought together. The needle 120 has a more extended movement than the arm 119 and consequently the wheel 124 is provided with a blank portion 126' which permits the needle to complete its inward swinging movement. The relative positions of the arm 119 and the needle 120 are best illustrated in Fig. 1 of the drawing when the said arm and needle are in closed positions. The blank portion 126' which permits the wheel 124 to have greater rotary movement than the wheel 138 is indicated in Figs. 22 and 23 of the drawings, and the wheel 128 is provided with a blank which slides along the under side of the wheel 124. The tube 133 is arranged within a tube 133' provided at its upper end with a gear wheel 134 which meshes with a gear wheel 135 carried by a shaft 136. The shaft 136 is provided with a gear wheel 137 which meshes with a gear wheel 131 carried at the upper end of the shaft section 114. When the wheel 137 makes a complete revolution a revolution is transmitted through the intervening parts to the tube 133. The ejector arm 139 is carried at the lower portion of the tube 133 and is adapted to engage the side of the complete shock and sweeps the same rearwardly as the machine moves in a forward direction. Just prior to the binding of the next shock, the arm 139 is turned around to a position just in advance of the shock. A disk 140 is carried at the lower end of the tube 133 and is provided with a flange 141 having openings 142 as best shown in Fig. 19. This disk is provided upon its under side with two sets of gear teeth indicated at 143 and 144, in dotted lines in Fig. 16. The gear teeth 143 are adapted to operate a twine holder indicated at 145 while the set of gear teeth 144 are adapted to operate a knotter indicated at 146 in Fig. 16. As the twine holder and the knotter are of conventional type, further description thereof is unnecessary except that the knotter is provided with serrations 147 whereby it is better able to engage the twine and hold the same during the knot tying operation.

The needle is hollow throughout its length and is provided at its pivoted end with a flexible twine guide 148 which leads the twine from a twine box 149 located at the lower end of one of the tubes 116. The needle is provided at its free end portion with a plate 150 which is adapted to travel along the upper end portions of the arm 119, and prevent stalks from catching between the needle and the arm 119. A shock holder arm 151 is pivoted at the lower end of the shaft of the needle 120. Said arm is provided with a catch member 152 which is adapted to spring down when the end of the flange 141 passes from under the same. This flange holds the arm 151 in a closed position. But when the shock has been completed the disk 140 is turned during the tying operation and the end of the catch 152 comes opposite one of the openings 142 and consequently the arm 151 is swung rearwardly by the weight of the stalks composing the shock. A flexible member 153 preferably of rubber or similar material is connected at one end with the free end portion of the shock holder arm 151 and at its other end is connected with the pivoted end portion of the needle 120 or any other part of the machine. When the free end portion of the arm 151 swings rearwardly the member 153 is elongated and as soon as the end of the arm 151 passes in front of the shock the said flexible member 153 draws the free end of the arm 151 toward the disk 140 so that the catch 152 of the said catch arm springs under and engages the flange 141 of the disk 140. The parts remain in these positions until the next shock is bound and deposited upon the ground. A needle guide 154 is provided through which the free end of the needle 120 passes when the needle is carried around the complete shock. This guide 154 is provided with a tongue 155 over which the twine is carried by the needle. The tongue 155 is provided with an upstanding pin 156 and a notch 157 adjacent the same. The twine can move from the notch 157 toward the pin 156 but cannot move out of the notch away from the pin. It is to be understood that when the needle 120 closes around the shock, one end of the twine is held by the twine holder 145 and from the said holder the twine passes and around the pin 156 then around the back of the shock and finally around the front of the shock. Thus two parts of the twine are adjacent each other at the side of the pin 156. The knotter 146 then rotates and ties the side portions of the twine together. The needle 120 continues its movement beyond the twine holder which is opened and the said holder then grasps the part of the twine which the needle draws toward the same. After which the needle moves along the plate 158 carried by the arm 151 and the twine is held by the plate in position on the knotter while it is being tied. This operation is repeated after the next shock is formed. The needle 120 is provided at its free end portion with a plate 159 which serves as a twine carrier and is adapted to push the twine toward the knotter.

By reference to Fig. 17 of the drawing it will be seen that the pointed end of the needle is recessed as at 160 and when the needle is opposite the knotter this recess affords ample room for the knotter to perform its operation upon the twine.

A lever 166 is fixed to one of the arms 92 and extends forwardly over the frame 1. This lever is best illustrated in Fig. 32 of the drawing. A spring 167 is fixed to the under side of the lever 166 and is provided with a shoulder 168. This shoulder is located above the cross bar 38 and the spring 167 is provided at its lower end with a recess 169 which is adapted to spring into engagement with the rear edge of the cross bar 38. When it is desired to shift the arms 92 transversely across the frame 1 the forward end of the lever 166 is depressed so that the recess 169 is moved below the cross bar 38. The lever 166 can be moved in a downward direction as above indicated until the shoulder 168 strikes the cross bar 38. By swinging the forward end of the lever 166 in a downward direction as stated the arms 92 are swung to the position indicated in Fig. 6 and thus the lugs 94 are moved from between the pins 95. Therefore by moving the lever 166 sidewise the arms 92 may be moved transversely across the machine so that the trailing members 97 may be properly adjusted with relation to the needle and the shock holder. This adjustment is especially desirable when the harvester is used on hill-sides for the reason that the shocks can be properly positioned upon the ground irrespective of the slope thereof.

Fig. 34 illustrates in detail the manner in which the inner end portions 41 of the arms 40 are connected with the sleeves 8. The inner portion of the arm 40 is carried around the sleeve 8 and snugly receives the same as at 170 and is then extended forward in a lug 171. This lug is spaced from the upper surface of the inner portion 41 of the arm 40 and a bolt 172 passes through the said lug 171 and the arm 40 and clamps the part 170 in position upon the sleeve 8. A stop 173 is located upon the part 170 of the arm 40 and is located in the path of movement of the platform 80. Therefore when the said platform swings in an upward direction in response to the pull of the spring 91 the upward swinging movement of the said platform is limited by the stop 173.

By reference to Fig. 25 it will be seen that the plate 101 is provided upon its under side with a stop 174 and the arm 119 carries upon its under side a lug 175. The stop 174 is located in the path of movement of the lug 175 and the said stop and lug have opposed beveled faces indicated at 176 and 177 respectively. These faces engage each other when the arm 119 moves toward the plate 101 and consequently the forward movement of the said arm 119 is checked and the forward end of the arm 119 is supported when the said arm is in closed position with relation to the plate 101.

Fig. 24 of the drawing illustrates in detail the manner in which the weed depressor 69 is mounted. The spring 70 is provided with a hump 178 which is adapted to engage notches 179 provided at the rear edge of the weed depressor 69. The weed depressor is pivoted at the point 180 to the frame of the harvester and the spring 70 is adjustably mounted in guides 181. Therefore the spring 70 may be shifted along the weed depressor 69 to engage the same at a point near the pivot 180 or remote therefrom as desired.

Figs. 14 and 14ᵃ of the drawing illustrate in detail one of the inner cutting apparatus of the harvester. In this device the rear part of the blade 64 extends under a plate 182 which is adjustably mounted on the fixed blade 65. This plate 182 has its forward edge so disposed that the fixed blade 65 cannot completely cut the stalks but can only partially cut the stalks, therefore the stalks cannot be completely cut by the blade 65 and fly in an upward direction. After they have been partially cut as above indicated by the blade 65, they are completely cut by the blade 64 and simultaneously engaged by the said blade and moved laterally toward the cradles. As illustrated in detail in Fig. 14ª the blade 64 is provided at its upper and lower faces and at its edge with serrations or teeth 183 which engage the stalks and push them toward the cradle as above indicated.

Plates 184 are provided under the side portions of the frame 1 and these plates are provided at their rear end portions with blades indicated at 185 in Fig. 2 of the drawing. As the harvester passes over the surface of the ground and the wheels 10 sink into the soil the said plates 184 will come in contact with the soil and permit the machine to slide along without sinking in the soil to such an extent as to interfere with the forward progress of the machine. The blades 185 engage the stumps of the stalks and cut the same so that after the machine has passed from the soil it is left practically free of standing stalks or other obstructions. The rear ends of the plates 184 are beveled as at 186 and these beveled surfaces are proximately parallel with the surface of the soil, therefore when the said plates encounter the soil ample bearing is provided between the plates and the soil to support the machine as above stated.

As illustrated in Fig. 1 of the drawing a stop 187 is located behind each weed depressor 69. These stops limit the rearward swinging movement of the said depressors.

Referring again to Fig. 26 of the drawing it will be seen that the arm 151 is screw threaded into engagement with a collar 188 which collar is held fixed in the hollow shaft 117 which carries the needle 120 and when the arm 151 turns to release the shock the threaded end thereof turns in the collar 188.

Fig. 28 of the drawing illustrates the arrangement of the parts which support and operate the arm 119. It will be seen that the said arm passes up through the tube 133 and the wheel 130 is fixed to the upper end of the arm 119. The tube 133 supports, at its lower end, the needle guide 154. Tube 133' is journaled on the tube 133 and carries, at its upper end, the beveled gear wheel 134 and, at its lower end, the disk 140.

Having described the invention what I claim as new and desire to secure by Letters Patent, is:

1. In a harvester, a cutting apparatus, a tiltable cradle, a stalk ejector pivotally mounted thereon, means connected with the stalk ejector for directing the stalks into the cradle as they are cut, and means for bending the stalks in a forward direction as they are cut.

2. In a harvester, a cutting apparatus, an arm extending forwardly therefrom and a cradle adjustably mounted on the arm.

3. In a harvester, a cutting apparatus, an arm extending forwardly therefrom, a cradle adjustably mounted on the arm and a stalk ejector carried by the cradle.

4. In a harvester, a cutting apparatus, an arm extending forwardly therefrom, a cradle adjustably mounted upon the arm, and a stalk ejector pivotally mounted on the cradle.

5. In a harvester, a cutting apparatus, an arm extending forwardly therefrom, a cradle adjustably mounted upon the arm, a stalk ejector mounted upon the cradle and means for directing the stalks into the cradle as they are cut.

6. In a harvester, a cutting apparatus, an arm extending forwardly therefrom, a cradle adjustably mounted on the arm, a stalk ejector pivotally mounted on the cradle, means connected with the stalk ejector for directing the stalks into the cradle as they are cut.

7. In a harvester, a cutting apparatus, an arm extending forwardly therefrom, a cradle adjustably mounted upon the arm, a stalk ejector mounted upon the cradle, means for directing the stalks into the cradle as they are cut and means for bending the stalks in a forward direction as they are cut.

8. In a harvester, a cutting apparatus, an arm extending forwardly therefrom and arranged for vertical swinging movement, a cradle carried by the arm and a stalk ejector carried by the cradle.

9. In a harvester, a cutting apparatus, an arm extending forwardly therefrom and arranged for vertical swinging movement, a cradle mounted upon the arm, a stalk ejector carried by the cradle and means for deflecting the stalks into the cradle as they are cut.

10. In a harvester, a cutting apparatus, an arm extending forwardly therefrom and arranged for vertical swinging movement, a cradle mounted upon the arm, a stalk ejector carried by the cradle, a stalk deflector carried by the stalk ejector, a stalk bender located in advance of the cutting apparatus and means for moving the stalk bender out of the path of movement of the cradle and the arm.

11. In a harvester, a cutting apparatus, a cradle mounted for vertical swinging movement, a stalk bender located in advance of the cutting apparatus and means for moving the stalk bender out of the path of movement of the cradle 12. In a harvester, a cutting apparatus, a cradle mounted for vertical swinging movement, a stalk ejector carried by the cradle, a stalk bender located in advance of the cutting apparatus and means for moving the stalk bender out of the path of movement of the cradle.

13. In a harvester, a cutting apparatus, a cradle mounted for vertical swinging movement, an ejector carried by the cradle, means for deflecting the cut stalks into the cradle, a stalk bender located in advance of the cutting apparatus and means for moving the stalk bender out of the path of movement of the cradle.

14. In a harvester, a cutting apparatus, a cradle mounted for vertical swinging movement, an upright carried upon the harvester, an abutment adjustably mounted on the upright and a stalk ejector pivotally mounted upon the cradle and engageable with said abutment.

15. In a harvester, a cutting apparatus, a cradle mounted for vertical swinging movement, a stalk ejector pivotally mounted upon the cradle, an upright located upon the harvester, an abutment adjustably mounted on the upright, and engageable by the stalk ejector.

16. In a harvester, a cutting apparatus, an upright located adjacent the cutting apparatus, an abutment carried by the upright, a cradle mounted for vertical swinging movement, a stalk ejector pivotally mounted upon the cradle and having an extension which constitutes a stalk deflector, said extension being engageable with the abutment when the cradle is swung vertically.

17. In a harvester, a cutting apparatus, an upright located adjacent said apparatus, an abutment carried by the upright, a cradle mounted for vertical swinging movement, a deflector carried by the cradle and having an extension which is engageable with the abutment and a stalk bender located in advance of the cutting apparatus.

18. In a harvester, a cutting apparatus, an upright located adjacent the cutting apparatus, an abutment carried by the upright, a cradle mounted for vertical swinging movement, a stalk ejector pivotally mounted upon the cradle and having an extension which is engageable with the abutment, a stalk bender located in advance of the cutting apparatus and means for moving the stalk bender out of the path of movement of the cradle.

19. In a harvester, a cutting apparatus, a cradle mounted for vertical swinging movement, a stalk ejector carried by the cradle, a stalk receptacle located adjacent the cutting apparatus for supporting cut stalks in standing positions and means for sweeping the stalks from the stalk receptacle and laying them in the cradle.

20. In a harvester, a cutting apparatus, a cradle mounted for vertical swinging movement, a stalk ejector pivoted to the cradle, a stalk receptacle located adjacent the cutting apparatus for holding standing stalks and means for sweeping the stalks from the receptacle and then laying them in the cradle.

21. In a harvester, a cutting apparatus, a cradle mounted for vertical swinging movement, a stalk ejector pivotally mounted upon the cradle and having an extension adapted to operate as a stalk deflector, a receptacle located adjacent the cutting apparatus and means for sweeping the stalks from the stalk receptacle into the cradle.

22. In a harvester, a cutting apparatus, a cradle mounted for vertical swinging movement, a stalk ejector pivoted to the cradle and having an extension adapted to direct the stalks into the cradle, a receptacle located adjacent the cutting apparatus, means carried by said extension for directing some of the stalks into the said receptacle and means for sweeping the stalks from the receptacle into the cradle.

23. In a harvester, a cutting apparatus, a cradle mounted for vertical swinging movement, a stalk ejector pivotally mounted upon the cradle, a receptacle located adjacent the cutting apparatus, a stalk bender located in advance of the cutting apparatus and adapted to operate to sweep the stalks from the receptacle into the cradle.

24. In a harvester, a cutting apparatus, a cradle mounted for vertical swinging movement, a bar located adjacent the cutting apparatus and having a notch which constitutes a stalk receptacle and means for sweeping the stalks from the receptacle into the cradle.

25. In a harvester, a cutting apparatus, a cradle mounted for vertical swinging movement, a stalk ejector carried by the cradle, a bar located adjacent the cutting apparatus and having a notch and means for sweeping the stalks from the notch into the cradle.

26. In a harvester, a cutting apparatus, a cradle mounted for vertical swinging movement, a stalk ejector pivoted to the cradle, a bar located adjacent the cutting apparatus and having a notch and means for sweeping the stalks from the notch into the cradle.

27. In a harvester, a cutting apparatus, a cradle mounted for vertical swinging movement, a stalk ejector pivoted to the cradle and having an extension adapted to direct stalks into the cradle, a bar located adjacent the cutting apparatus and having a notch and means for sweeping the stalks from the notch into the cradle.

28. In a harvester, a cutting apparatus, a cradle mounted for vertical swinging movement, a stalk ejector pivoted to the cradle, said ejector having an extension adapted to direct stalks into the cradle, a bar located adjacent the cutting apparatus and having a notch, a rod attached to said extension and adapted to direct some of the stalks into the notch and means for sweeping the stalks from the notch into the cradle.

29. In a harvester, a cutting apparatus, a cradle mounted for vertical swinging movement, a stalk ejector carried by the cradle, a bar located adjacent the cutting apparatus and having a notch, a stalk bender located in advance of the cutting apparatus and adapted to operate to sweep the stalks from the notch into the cradle.

30. In a harvester, a plurality of cutting mechanisms, a tiltable cradle mounted between the cutting mechanisms and a stalk ejector pivotally mounted on the cradle.

31. In a harvester, a plurality of cutting mechanisms, a tiltable cradle located between the cutting mechanisms, a stalk ejector pivotally mounted upon the cradle, means connected with the stalk ejector for directing the stalks from one of the cutting mechanisms into the cradle, means for bending the stalks in a forward direction, and means for directing the stalks from the other cutting mechanism into the cradle.

32. In a harvester, a cradle mounted for vertical swinging movement, a wheel operatively connected with the cradle, and a beam eccentrically connected to the wheel and adapted to encounter the ground to turn the wheel.

33. In a harvester, a cradle mounted for vertical swinging movement, a wheel connected with the cradle, a beam eccentrically connected with the wheel, a fluke adjustably carried at the end of the beam.

34. In a harvester, a cradle mounted for vertical swinging movement, a wheel connected with the cradle, a beam eccentrically connected with the wheel, means for normally holding the free end of the beam in an elevated position and a fluke carried at the end of the beam.

35. In a harvester, a cradle mounted for vertical swinging movement, a wheel connected with the cradle, a beam eccentrically connected with the wheel, means for holding the beam in an elevated position, means for moving the beam from the said holding means and means for replacing the beam upon the holding means.

36. In a harvester, a cradle mounted for vertical swinging movement, a wheel connected with the cradle, a beam eccentrically connected to the wheel, an arm for normally supporting the free end of the beam and a cross bar located in the path of movement of the beam and between the arm and the wheel.

37. A harvester comprising a wheel mounted frame, a cradle mounted upon the frame having vertical swinging movement, means for operating the cradle from the supporting wheels of the harvester, and a beam engageable with the ground for assisting in the operation of the cradle.

38. A harvester comprising a wheel mounted frame, a cradle mounted thereon for vertical swinging movement, means for operating the cradle from the supporting wheels of the harvester, a beam connected with said operating means and a fluke adjustably mounted upon the beam and engageable with the ground.

39. A harvester comprising a wheel mounted frame, a cradle mounted thereon and having vertical swinging movement, means for swinging the cradle from the supporting wheels of the frame, a beam connected with the last said means, means for supporting the beam in an elevated position, said beam being adapted to be brought in contact with the ground and means for replacing the beam upon its support.

40. A harvester comprising a frame, sleeves journaled thereon, cradles connected with the sleeves, axle shafts journaled in the sleeves, wheels carried by the axle shafts, a yoke connecting the sleeves together, a wheel operatively connected with the yoke, means for turning the wheel from the axle shafts and a beam pivotally connected with the wheel and engageable with the ground.

41. A harvester comprising a frame, a tiltable cradle mounted thereon, an inclined platform located behind the cradle and a flexible curtain trailing from the lower end of the platform.

42. A harvester comprising a frame, a tiltable cradle mounted thereon and a trailing curtain located behind the cradle for supporting stalks delivered by the cradle.

43. A harvester comprising a frame, a tiltable cradle located thereon, a trailing curtain located behind the cradle for supporting stalks delivered by the cradle and means for winding and unwinding the curtain.

44. A harvester comprising a frame, a tiltable cradle located thereon, a downwardly and rearwardly inclined platform located behind the cradle, a shaft journaled to the platform, means for turning the shaft and a trailing curtain connected to and adapted to be wound and unwound by the shaft, said curtain constituting means for receiving and supporting stalks on end when delivered from the platform.

45. A harvester comprising a frame, a tiltable cradle mounted thereon, a platform located behind the cradle and mounted to swing about a transverse axis, means depending from the platform for resiliently holding the platform in an upward direction and a trailing curtain carried by the platform.

46. A harvester comprising a frame, a cradle tiltably mounted thereon, a platform located behind the cradle and mounted to swing about a transverse axis, ground engaging ribs carried by the platform and constituting yielding supports for the platform and a trailing curtain located upon the ribs.

47. A harvester comprising a frame, a tiltable cradle located thereon, a pivoted platform located behind the cradle, resilient ground engaging ribs carried by the platform and a trailing curtain located upon the ribs.

48. A harvester comprising a frame, a tiltable cradle located thereon, a pivoted platform located behind the cradle, downwardly and rearwardly bowed ground engaging ribs connected to the platform and a trailing curtain resting upon the ribs.

49. A harvester comprising a frame, a tiltable cradle located thereon, a pivoted platform located behind the cradle, ground engaging ribs connected to the platform and constituting a yielding support for the platform, a trailing curtain located upon the ribs and means for lengthening or shortening the curtain.

50. A harvester comprising a frame, tiltable cradles located thereon, means for ejecting stalks from the cradles, a platform located behind the cradles for receiving standing stalks therefrom, means supported above the platform for bringing the heads of the stalks together and means supported above the plane of and trailing rearwardly from the platform for holding the butts of the stalks of the bunches from the cradles separated.

51. A harvester comprising a frame, tiltable cradles located thereon, stalk ejectors carried by the cradles, a platform located behind the cradles for receiving standing stalks therefrom, means supported above the platform for bringing heads of the ejected stalks together, means trailing behind the platform for maintaining the bases of the bunches of stalks from the stalks separated.

52. A harvester comprising a frame, tiltable cradles located thereon, a platform located back of the cradles for receiving standing stalks therefrom, means supported above the platform for bringing the heads of the stalks of the bunches from the cradles together, means adjacent the platform for holding the bases of the bunches separated and means trailing back of the platform for spacing the bases of the stalks in lines parallel with the line of draft of the harvester.

53. A harvester comprising a frame, tiltable cradles located thereon, a platform located back of and adapted to receive standing stalks from the cradles, means supported above the platform for bringing the heads of the bunches from the cradles together, spacing members trailing rearwardly from the platform for holding the bases of the bunches separated and means for varying the distance between the spacing members.

54. A harvester comprising a frame, cradles tiltably mounted thereon, a platform located back of and adapted to receive standing stalks from the cradles, means supported above the platform for bringing the heads of bundles from the cradles together, arms adjustably connected to the frame adjacent the back of the platform, trailing members pivotally connected to the arms and means for holding the trailing members spaced from each other.

55. A harvester comprising a frame, cradles tiltably mounted thereon, a platform back of the cradles and adapted to receive standing stalks therefrom, uprights adjustably mounted upon the frame adjacent the platform and bundle gathering means mounted upon the uprights and extending rearwardly and laterally therefrom.

56. A harvester comprising a frame, cradles mounted thereon, a platform for receiving standing stalks from the cradles, uprights tiltably mounted upon the frame and adjacent the platform, means for securing the uprights in adjusted positions and bundle gathering means mounted upon the uprights and above the platform.

57. A harvester comprising a frame, cradles mounted thereon, a platform back of the cradles and adapted to receive standing stalks therefrom, uprights mounted upon the frame and adjacent the platform, bundle gathering means mounted upon the uprights and above and extending rearwardly beyond the platform and means for adjusting the bundle gathering means vertically.

58. A harvester comprising a wheeled frame, cradles mounted thereon, a platform back of and adapted to receive standing stalks from the cradles, uprights mounted upon the frame and adjacent the platform, wheels supporting the frame, bundle gathering means mounted upon the uprights and above and extending rearwardly beyond the platform and means for operating the bundle gathering means from the supporting wheels of the frame.

59. A harvester comprising a wheeled frame, cradles mounted thereon, a platform located back of and adapted to receive standing stalks from the cradles, uprights mounted upon the frame and adjacent the platform, wheels supporting the frame, bundle gathering means mounted upon the uprights and above and projecting rearwardly beyond the platform, means for operating the bundle gathering means from the supporting wheels of the frame and means for adjusting the bundle gathering means vertically and operated from the supporting wheels of the frame.

60. A harvester comprising a frame, cradles mounted thereon, a platform back of and adapted to receive standing stalks from the cradles, uprights mounted upon the frame and adjacent the platform, bundle gathering means mounted upon the uprights and a shock binding mechanism supported upon the uprights, said gathering means and binding mechanism being arranged above and projecting rearwardly beyond the platform.

61. A harvester comprising a frame, cradles mounted thereon, a platform back of and adapted to receive standing stalks from the cradles, uprights mounted upon the frame, and adjacent the platform, bundle gathering means mounted upon the uprights, a shock binding means mounted upon the uprights and a shock ejector mounted upon the uprights, said gathering means and binding mechanism being arranged above and projecting rearwardly beyond the platform.

62. A harvester comprising a frame, cradles mounted thereon, a platform back of and adapted to receive standing stalks from the cradles, uprights mounted upon the frame and adjacent the platform, bundle gathering means mounted upon the uprights and a shock holder mounted upon the uprights, said bundle gathering means and shock holder being supported above and extended rearwardly beyond the platform.

63. A harvester comprising a frame, cradles mounted thereon, a platform back of and adapted to receive standing stalks from the cradles, uprights mounted upon the frame and adjacent the platform, bundle gathering means mounted upon the uprights, a shock holder mounted upon the uprights, said gathering means and shock holder being located above and projecting rearwardly beyond the platform, means for locking the shock holder in closed position, said shock holder adapted to be opened by the weight of the shock and means for returning the shock holder to closed position.

64. A harvester comprising a frame, cradles located thereon, a platform back of and adapted to receive upstanding stalks from the cradles, uprights mounted upon the frame and adjacent the platform and adapted to be adjusted with relation to the same, bundle gathering means carried by the uprights, a binding means carried by the uprights, a shock holder carried by the uprights and a shock ejector carried by the uprights, said gathering means, binding means, shock holder and shock ejector being supported above and extended rearwardly beyond the platform..

65. A harvester comprising a frame, cradles mounted thereon, a platform back of and adapted to receive upstanding stalks from the cradles, uprights adjustably mounted upon the frame and adjacent the platform, bundle gathering means carried by the uprights, binding means carried by the uprights, a bundle holder carried by the uprights, a shock ejector carrier by the uprights and means for adjusting simultaneously the bundle gatherers, shock binder, shock holder and shock ejector vertically, said bundle gatherer, shock binder, shock holder and shock ejector being supported above and extended rearwardly beyond the platform.

66. The combination with means for cutting four rows of corn simultaneously, of means for combining the cut portions of two adjoining rows, like means for combining the cut portions of the remaining rows, and means for assembling the separately held cut portions thus combined, into a single shock.

67. The combination with means for cutting a plurality of rows of corn, of means for combining the cut of certain of the rows in one bundle, like means for combining the cut of the remaining rows into another bundle, means for combining the bundles into a single shock, means for supporting the forward portion of the shock while letting the rear drag on the ground, and means for discharging the finished shock from the machine.

68. The combination of means for cutting corn from a plurality of rows, of means for setting said corn in vertical position, and means for spacing the contents of the cut comprising a pivoted latch member and devices mounted on the machine comprising a plurality of projections thereon adapted to engage with said latch member.

69. The combination of means for cutting a plurality of rows of corn, a receiver for the corn which is cut, means for swinging said receiver upward to discharge its contents, and separate means for catching and supporting in upstanding positions the stalks cut while the receiver is raised.

70. The combination of means for cutting corn, of means for catching the stalks cut, means for raising the receiver to render said stalks vertical, means for catching and supporting in upstanding positions the stalks cut while the receiver is raised, and means for throwing the stalks, cut while the receiver is raised, into the receiver when it is lowered.

71. The combination of means for cutting a plurality of stalks of corn, means for receiving said stalks, means for raising said receiver comprising a member adapted to engage the ground at its forward end, and means for bringing said member in contact with the ground to raise said stalks at intervals.

72. The combination of means for cutting a plurality of rows of corn, of means for forming the stalks in said rows into a shock, said means comprising a plurality of means for swinging the stalks upwardly, rearwardly and laterally to upstanding positions and together, means for compressing said corn near the top, means for placing a binder around said corn, and means for discharging the shock from the machine.

73. In a harvester, a receiver, and means for actuating the receiver to elevate accumulated stalks, said means including a drive element, a clutch, a clutch shift, an anchor and means for tipping said anchor by the movement of said shift.

74. In a harvester, a receiver for collecting cut stalks, a drive element, a rock member, means for transmitting motion from said element to the rock member, an anchor, an anchor beam connected to said rock member and an anchor beam support so located that the rocking of said member raises the opposite end of said anchor beam.

75. In a harvester, a cradle, a cutter located adjacent each side of said cradle, means for actuating the cutter and an arm arranged to receive cut stalks from two rows, said arm being pivoted to one side of said cradle and extending to the opposite side of said cradle.

76. In a harvester, a cutter, a cradle for receiving stalks from the cutter, means for discharging cut stalks rearwardly and laterally from the cradle, a flexible sheet arranged to drag behind said cutter and means for directing the cut stalks discharged from the cradle, onto the sheet with their butt ends lowermost.

77. In a harvester, a cutter, a cradle, means for actuating the cutter, means for directing cut stalks onto the cradle, means for actuating the cradle to discharge the stalks therefrom with their butt ends lowermost, a flexible drag arranged behind said cutter, means for directing the delivered stalks with their butt ends lowermost onto the drag, and a rope connected at the rear of said drag to prevent cut stalks from pulling off said drag.

78. In a harvester, a cutter, a cradle, means for actuating the cutter, means for directing cut stalks onto the cradle, means for actuating the cradle to discharge the stalks therefrom with their butt ends lowermost, a barrel arranged in rear of said cradle, a flexible sheet connected to said barrel, means for winding said barrel, and means for locking said barrel, and means for directing the delivered stalks from the cradle and onto the sheet, with their butt ends lowermost.

79. In a harvester, a main frame, a receiver, receiver operating mechanism carried by the frame, an anchor beam connected to said mechanism and adapted to oscillate vertically relative to the frame, an anchor carried by the beam, means for supporting the beam with the anchor out of contact with the ground, means for shifting the beam out of engagement with its support, said anchor beam being adapted to operate the said mechanism during the movement of the main frame, thereby to actuate the receiver.

80. In a harvester, a receiver, and mechanism for actuating the receiver to elevate accumulated stalks, said mechanism including a beam, a support for the beam, a fluke secured to one end of the beam, and means for shifting the beam off of the support to deposit the fluke in engagement with the ground.

81. In a harvester, a receiver, and mechanism for actuating the receiver to elevate accumulated stalks, said mechanism including a beam, a support for the beam, a fluke secured to one end of the beam, and means for shifting the beam off of the support to deposit the fluke in engagement with the ground, said fluke being vertically adjustable on the beam.

82. In a harvester, a receiver, and mechanism for actuating the receiver to elevate accumulated stalks, said mechanism including a beam, a support for the beam, a fluke secured to one end of the beam, means for shifting the beam off of the support to deposit the fluke in engagement with the ground, and means for deflecting the beam around the support when the beam and fluke are elevated from the ground.

In testimony that I claim the foregoing as my own, I have hereto affixed my signature in the presence of two witnesses.

LUTHER T. VELEN.

Witnesses:
SELINA WILLSON,
I. E. SIMPSON.

Copies of this patent may be obtained for five cents each, by addressing the "Commissioner of Patents, Washington, D. C."